June 6, 1933. D. W. O'BRIEN 1,912,914
PLANT CULTIVATING AND DISTRIBUTING APPARATUS AND METHOD
Filed Feb. 12, 1931
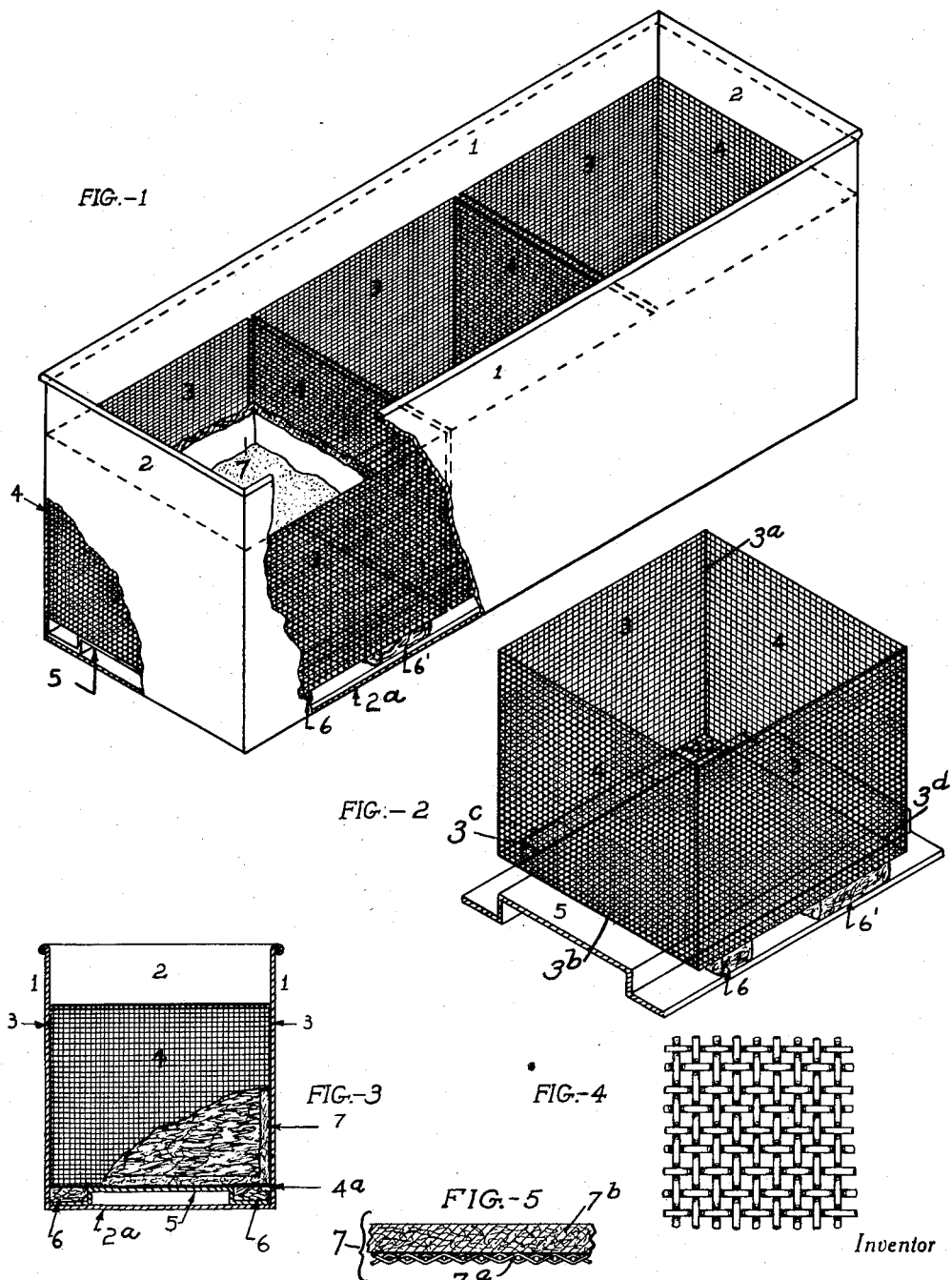
Inventor
Daniel W. O'Brien
By Emery, Booth, Varney & Townsend
Attorneys Patented June 6, 1933

1,912,914

UNITED STATES PATENT OFFICE

DANIEL W. O'BRIEN, OF WALTHAM, MASSACHUSETTS

PLANT CULTIVATING AND DISTRIBUTING APPARATUS AND METHOD

Application filed February 12, 1931. Serial No. 515,211.

My present invention relates to the culture of plants and more particularly aims to provide a simple, inexpensively manufactured and otherwise improved growing device or receptacle adapted both for the raising of plants and for their transportation, sale and retail distribution, and contemplates such novel receptacle both of itself and in cooperation with various other containers wherein it may be used.

In the drawing, illustrating by way of example one embodiment of the invention,

Figure 1 is a perspective view showing a number of receptacles or plant containing units in conjunction with a window box or the like;

Fig. 2 shows a single plant container unit in position upon a base member, in section, such as may be employed in the assembly of Fig. 1;

Fig. 3 is a vertical cross-section through the assembly of Fig. 1;

Fig. 4 is a detail view upon a larger scale illustrating one material which may be used for forming the container units, and as shown in Figs. 1 to 3; and Fig. 5 is a section of an absorbent sheet material which may be used in connection with the apparatus of Figs. 1 to 4.

According to the present practice, followed for many years, so-called "potted plants" have been grown and kept in earthenware pots of general truncated conical form having an aperture in their bottom. Such standard flower pots have apparently persisted in general use because of their comparative cheapness, and despite their numerous objections, such as their bulkiness, weight and easy breakage. In accordance with my invention, I provide a plant receptacle having all the desirable features of the ordinary flower pot, of commensurate cheapness, but which is markedly lighter in weight and which in actual practice has been demonstrated to promote a more rapid, healthier and more luxurious plant growth.

Referring now to the drawing, I have shown in Figs. 1 and 3 an outer element or container, including side walls 1, 1, end walls 2, 2 and an imperforate bottom 2a, the container as a whole preferably being capable of retaining water, or at least providing a water chamber at its lower portion. This container as illustrated is of the type commonly used for a window or table box for plants but is shown merely as illustrative of the numerous water-retaining structures to which my invention is applicable, such as plant boxes of numerous varieties, including porch boxes, ferneries, jardinieres, plant dishes, cemetery urns, rustic or memorial baskets, or other plant holding or growing structures.

My invention contemplates the provision, within such outer container, of a replaceable or "refill" unit for containing the plant-growing material or soil. Depending on the size and nature of the outer container, there may be one, two or more of such inner units, and in Fig. 1 I have illustrated three, in this instance of rectangular and substantially square box-like form, as best seen in Fig. 2, fitting them to the container, desirably with but little or no space about the unit sides above that attendant on a readily removable sliding fit of the unit or units within the outer member.

Various foraminous materials may be employed in the construction of the soil-containing units, and the size and shape of the latter may be widely varied. For the purposes of illustration I have shown an open-mesh woven wire fabric or sheet material, a section of which appears on an enlarged scale in Fig. 4. The size of mesh may be varied but in practice I have found apertures of approximately a quarter inch diameter highly satisfactory. Suitably galvanized wire or other highly porous sheet material either metallic or non-metallic, may be used, including various closely perforate materials, readily permeable by moisture and of suitable rigidity and strength to be non-disintegrable in the presence of moisture, such as cribriform sheet metal and others.

The illustrative soil-container units of the drawing include the foraminous or open-mesh side walls 3 and 4, and the similar bottom wall 4a. They may be made up from a single blank of the sheet material, such as the wire mesh illustrated, the side members preferably being formed from a continuous strip, which in the case of woven material, will be selvaged along at least one edge. This strip is folded to provide the desired number of panels or wall members, the outer panels being joined along their meeting side edges. In the case of a rectangular unit, such as shown, there may thus be but a single vertical corner seam or joint, as indicated at 3a, Fig. 2, and where a woven material is used, the top edge of the entire unit will be selvaged.

The bottom wall or panel 4a is preferably integral at one of its edges with one of the side panels 3, 4, and is secured to the other side panels along its remaining edges. The walls may be joined in any convenient manner, both at the bottom and the one or more non-integral vertical edges, as by wire stitching, soldering, welding or otherwise, providing firm seams or unions, as indicated at 3a, 3b, etc. Fig. 2. The highly porous or foraminous soil container thus provided is thus preferably free of external projections and irregularities, but is of substantially uniform structure throughout.

When used in connection with an outer container, such as that of Fig. 1, means is desirably provided for spacing the soil-holding units vertically above the bottom of the outer container. Such means is preferably structurally separate from the inner or "refill" units, and for this purpose I have shown a base element 5 comprising a metallic or other sheet formed with a raised longitudinal rib substantially in the manner illustrated. The flat bases of the inner units are supported by said means in the manner clearly seen in Figs. 2 and 3, thus providing a reservoir or storage space for water below the units, but dispensing with legs, feet, hangers or other projections at the base or other parts of the latter.

Within each of the closely perforate "refill" units or receptacles I desirably provide a liner 7 of highly absorbent material, preferably wholly of organic substance, and capable of transferring moisture by capillarity to the bottom and/or one or all side portions of the unit, and serving also as an insulating medium to assist in preserving more even soil temperatures. For this purpose I have devised a sheeted or matted element or sheet material composed to a considerable extent, or even wholly, of Sphagnum moss, in which term I include numerous mosses or moss-like growths, with which may be commixed various organic fibrous materials such as wood or paper pulp, jute fibre or the like. The moss, with any commixed material, is first moistened, then compressed to a sheet of the desired thickness, and dried, resulting in a board in which the glutinous or other adhesive matter of the moss aids in retaining the matted state of the material as a whole. This board element is sufficiently rigid and of adequate tensile strength to be self-supporting but is flexible and if dampened may readily be bent or folded into any desired shape. In one form, as shown in Fig. 5, I provide a base layer of burlap or other fabric 7a which is pressed on and into the Sphagnum layer 7b to further increase its tensile strength. Among other uses, this sheet material is admirably adapted to serve as a growing material, as for the germinating, starting and growing of grass or other seed directly upon it, for producing "lawns", as for horticultural exhibitions, window displays, golf greens and like purposes.

The relative proportions of the Sphagnum moss and other material may be widely varied, and my invention is in no wise limited to the use of this particular absorptive material, as any organic or fibrous material capable of adequate capillary activity and of sufficient substance to resist rapid disintegration may be employed. In Figs. 1 and 3 the Sphagnum moss sheet or lining element, with or without a fabric base, is indicated as a whole at 7, being shown as a complete liner, at all vertical sides and at the bottom. It may be in a single piece cut and arranged for folding to the desired shape, or may be inserted as a plurality of pieces, and may be provided at less than the entire inner surface area of the soil unit. The soil is placed directly within and is retained by this liner element 7, and by the latter moisture is adapted to be conveyed directly, regularly and uniformly to all desired areas of the plant soil including the bottom and any or all side portions, to any height deemed necessary, generally to the top of the contained soil mass, this liner and attendant air spaces serving also to insulate the soil against undesirable temperature changes.

In cooperation of the soil-receiving foraminous units of my invention, and with the absorbent lining means thereof, when employed, I desirably provide, in the complete apparatus or assembly including a water-retaining outer container such as that of Fig. 1, wicking means for conveying moisture from the water chamber of the outer container to the soil of the inner receptacle either directly or preferably through the medium of the absorbent lining 7.

As illustrated in Fig. 2, said means comprises a body of Sphagnum moss or other absorbent material at the base of the soil receptacle, two such wick elements, of different size, being indicated at 6 and 6' respectively in said figure, in the space or water-chamber provided between the bottom of the soil receptacle and the bottom of the outer container by means of the base element 5. By adjusting the size, composition or number of wicking elements a predetermined and controllable quantity of moisture is conveyed to the soil unit, by capillarity, and to each of a plurality of soil units independently and automatically. Thus the rate of transfer of moisture may be varied to suit the particular plant growth and attendant conditions, and said absorption rate may be controlled and adjusted both as to different sections of a given soil unit, and as to separate soil units of a plurality in a single outer container such as that of Fig. 1. Accordingly different plants requiring widely different degrees of moisture may be properly conditioned as to soil humidity in a single water-retaining outer container. If desired I may provide insulating means between adjacent soil units in a single container, such as a glass or other moisture resistant or impervious partition, to prevent lateral moisture transfer between units. It will be understood that where I use the term "soil" I include any plant growing medium, such as peat and others sometimes used instead of earth.

From the foregoing it will be apparent that the foraminous soil receptacles or units of my invention meet all former requirements served by the ordinary clay flower pot, but in addition present numerous advantages, both in and of themselves and in cooperation with other plant growing apparatus. Each of the highly porous soil receivers or units may constitute a convenient and inexpensive, independent plant package in which so-called "potted plants" may be grown, transported and merchandized through the usual florist trade channels or otherwise. When of rectangular or angular form such as illustrated, these units readily lend themselves to wrapping or packaging in a cardboard box or the like, making a more attractive and convenient package for transportation by a purchaser.

In combination with outer receptacles capable of receiving one or a plurality of the soil units, the latter constitute "refill" devices whereby the plant growth for the desired section of the outer container, such as the table or window box of Fig. 1, may readily be renewed. The user need but lift out any particular unit in which the plant growth has passed its prime or for any reason is desired to be changed, discard it, and replace it by a new plant-containing unit, which may be supplied in standard sizes by florists and others.

An important advantage attendant on my invention is that an adequate and controlled moisture supply may be automatically provided, without requiring attention from the grower except at relatively long intervals of time. An assembly such as that of Fig. 1 is accordingly particularly adapted for use in school houses where plants frequently cannot have daily attention because the buildings are closed over weekends and extensive vacation periods. The same applies to office buildings and the like and to residences during periods of absence of the occupant. Another extensive field of use for the foraminous soil receptacles of the invention is in connection with funeral urns and the like such as used in cemeteries, whereby rooted plants may be kept in proper condition for longer periods and without frequent attention.

For example, in actual use, an apparatus such as that of Fig. 1 has been run without renewal of the water in the base chamber for a period in excess of five weeks, at the end of which the plants, in this instance begonia, coleus, English and German ivy and geraniums, showed no signs of wilting or other ill effects from the lack of moisture.

But the apparatus such as that of Fig. 1 is found not only to provide for normal conditioning and growth of the plants through long periods of inattendance by the owner, but it results in a more rapid, healthier and more luxurious plant growth. In comparative tests using the foraminous absorbent-lined soil receptacles and cooperating elements of my apparatus side by side with identical plants in ordinary flower pots and plant boxes, the plants grown with the use of my apparatus showed a markedly superior growth both of foliage and of flowers. I attribute these superior results to the provision for lateral irrigation in conjunction with bottom irrigation, adequate aeration of the roots, and the moist atmosphere provided about the plant foliage due to the capillary transfer of moisture not only to the bottom of the soil mass but to its sides, including the upper portions thereof, and hence to the entire soil mass and the adjacent atmosphere. The moist atmosphere thus provided establishes a favorable rate of transpiration, as contrasted for example with the usual dry atmospheric conditions prevailing in the majority of heated buildings.

My invention is not limited to the specific embodiments herein set forth and described, its scope being pointed out in the following claims.

I claim:

1. Plant growing apparatus comprising, in combination, a soil container having foraminous bottom and side walls, a soil-retaining and moisture-transferring liner of organic material for said container, an outer receptacle adapted to enclose the container sides and having a water-retaining chamber at its lower portion, means to support said container above and substantially spaced from the bottom of the water chamber, and moisture-transferring means intermediate the lower portion of the water chamber and the liner of the soil container.

2. In combination, for use in the cultivation, transportation and sale of plants, a water-retaining outer container, at least the lower portion of which is adapted to serve as a water reservoir, one or more structurally separate inner unit receptacles constructed and arranged for readily removable reception in said outer container, each such unit including enclosing side and bottom walls of foraminous construction, means for supporting each unit in vertically spaced relation with the bottom of the outer container, wick means at the lower portion of the inner unit, and liner means of absorbent organic material over a substantial portion of the inner surface area of each inner unit.

3. As a new article of manufacture, a flexible board-like sheet material comprising chiefly wetted Sphagnum moss compressed and dried, and a coarse open-mesh fabric backing element incorporated therewith, for packing, wrapping, lining, seed-growing and like purposes, particularly in connection with plant culture and distribution.

4. That method of cultivating plants which consists in irrigating a soil unit mass wholly from below, both directly vertically through the base and also laterally externally of the mass throughout substantially its entire lateral extent, by absorptively and automatically supplying moisture at a predetermined and controllable rate uniformly to the soil unit bottom and side regions, thereby effecting and maintaining more efficient soil humidity and an atmospheric condition for the foliage conducive to a more favorable rate of transpiration.

5. As a new article of manufacture and commerce, a readily transportable and removable refill soil-container unit for plant boxes and the like comprising a substantially rectangular open-top pre-shaped container element composed wholly of uniformly foraminous metallic sheet material of a self-supporting rigidity, adapted to receive moisture by capillarity through substantially all its portions, including a flat bottom wall on which it is adapted to stand and enclosing flat side walls not exceeding the height of those of the plant box within which it is to be received, and a removable fibrous absorbent soil-retaining liner for said unit, said unit and liner also constituted as a package for the sale and distribution of plants and as a substitute for the usual flower-pot.

In testimony whereof, I have signed my name to this specification.

DANIEL W. O'BRIEN.